United States Patent
Irino

(10) Patent No.: US 8,270,013 B2
(45) Date of Patent: Sep. 18, 2012

(54) PRINTING SYSTEM, PRINTING METHOD, AND COMPUTER PROGRAM PRODUCT

(75) Inventor: Yoshiaki Irino, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 578 days.

(21) Appl. No.: 12/211,333

(22) Filed: Sep. 16, 2008

(65) Prior Publication Data

US 2009/0086261 A1 Apr. 2, 2009

(30) Foreign Application Priority Data

Sep. 27, 2007 (JP) ................................ 2007-252409
Aug. 28, 2008 (JP) ................................ 2008-220091

(51) Int. Cl.
*G06F 3/12* (2006.01)
(52) U.S. Cl. .............. 358/1.15; 358/1.11; 358/1.13; 358/1.14; 713/151; 713/169; 713/193
(58) Field of Classification Search ........... 358/1.11, 358/1.14, 1.15, 1.8, 435, 1.1, 1.13; 713/165, 713/160, 170, 182; 709/203, 219, 220; 726/2, 726/5; 705/62
See application file for complete search history.

(56) References Cited

U.S. PATENT DOCUMENTS

| | | | |
|---|---|---|---|
| 7,355,739 B2 | 4/2008 | Irino | |
| 7,372,588 B1* | 5/2008 | Jeong | 358/1.15 |
| 7,383,321 B2* | 6/2008 | Moyer et al. | 709/219 |
| RE42,170 E * | 2/2011 | Furukawa | 712/1 |
| 7,894,083 B2* | 2/2011 | Kuroda et al. | 358/1.13 |
| 2002/0131059 A1* | 9/2002 | Tsuchitoi | 358/1.1 |
| 2003/0074656 A1 | 4/2003 | Irino | |
| 2005/0162688 A1* | 7/2005 | Nakaoka et al. | 358/1.15 |
| 2005/0286078 A1* | 12/2005 | Maruyama | 358/1.15 |
| 2006/0077456 A1* | 4/2006 | Aoki | 358/1.15 |
| 2006/0082827 A1* | 4/2006 | Lee et al. | 358/1.15 |
| 2006/0203282 A1* | 9/2006 | Iwai | 358/1.15 |
| 2006/0283939 A1* | 12/2006 | Hwang | 235/382 |
| 2008/0100864 A1* | 5/2008 | Kadowaki | 358/1.15 |
| 2008/0106758 A1* | 5/2008 | Kazume | 358/1.15 |
| 2008/0117452 A1* | 5/2008 | Murakami | 358/1.15 |

FOREIGN PATENT DOCUMENTS

| | | |
|---|---|---|
| JP | 2005-165774 | 6/2005 |
| JP | 2005-182105 | 7/2005 |
| JP | 3833127 | 7/2006 |
| JP | 2006-240006 | 9/2006 |
| JP | 3901184 | 1/2007 |

* cited by examiner

*Primary Examiner* — Marivelisse Santiago Cordero
*Assistant Examiner* — Moustapha Diaby
(74) *Attorney, Agent, or Firm* — Oblon, Spivak, McClelland, Maier & Neustadt, L.L.P.

(57) ABSTRACT

An information processing apparatus generates print data in response to a print request, stores the print data in a storage unit, and enters a standby state for waiting for a print-data transmission request. An image forming apparatus transmits the print-data transmission request to the information processing apparatus corresponding to input identification data for uniquely identifying the information processing apparatus, receives the print data from the information processing apparatus, and prints out the print data.

13 Claims, 11 Drawing Sheets

PRINTING SYSTEM, PRINTING METHOD, AND COMPUTER PROGRAM PRODUCT

CROSS-REFERENCE TO RELATED APPLICATIONS

The present application claims priority to and incorporates by reference the entire contents of Japanese priority document 2007-252409 filed in Japan on Sep. 27, 2007 and Japanese priority document 2008-220091 filed in Japan on Aug. 28, 2008.

BACKGROUND OF THE INVENTION

1. Field of the Invention

The present invention relates to a technology for performing a print request operation without designating in advance a printer to be used.

2. Description of the Related Art

In recent years, a printing system in which a plurality of printers is connected via a network has been widely used. Japanese Patent Application Laid-open No. 2003-271354 discloses a technology for performing proxy printing in which, even if a printer fails to operate, another printer performs a printing operation instead, so that a print request from a user can be processed without fail. Japanese Patent Application Laid-open No. 2006-048434 discloses a technology for performing confidential printing in which it is assured that only an authorized user can obtain print result from a printer.

However, with the above technologies, it is necessary to designate a printer for the printing operation when the user performs a print request operation, or register a plurality of printers for the proxy printing in advance. Therefore, after the user performs the print request operation, the user cannot use another printer for the printing operation instead of the designated printer. Moreover, it is hard for the user to use an unregistered printer even if the user needs to use the printer with urgency.

For example, in a situation where a printer is malfunctioning when a user tries to print out documents for a meeting held at a meeting room in a separate building just before the meeting is started, it is efficient for the user to print out the documents from a printer near the meeting room. However, with the above technologies, the user needs to know about the printer installed near the meeting room in advance, and confirm that the printer is currently in operation before using the printer. Specifically, in a printing system shown in FIG. 1, when a user prints out documents on the floor A3, the user usually uses a printer 301b installed on the floor A3. However, if the printer 301b is out of order, and the meeting will start soon, the user needs to use another printer instead of the printer 301b immediately. Even in such a case, the user needs to check which printer on which floor can be used in advance, and therefore the user requires unnecessary time for checking on the printer.

Moreover, with the above technologies, print data is transmitted from a personal computer (PC) to a printer or a printer server before the printing operation is performed. Because the print data is spooled in the printer or the printer server until the printing operation is completed or cancelled, it is difficult to assure the data security.

SUMMARY OF THE INVENTION

It is an object of the present invention to at least partially solve the problems in the conventional technology.

According to one aspect of the present invention, there is provided a printing system including an information processing apparatus that processes information on a printing operation and an image forming apparatus that is connected to the information processing apparatus via a network and that performs the printing operation based on the information processed by the information processing apparatus. The information processing apparatus includes a print-data generating unit that generates print data in response to a print request, a storage unit that stores therein the print data generated by the print-data generating unit, and a first communication processing unit that, when the print-data generating unit generates the print data, enters a standby state for waiting for a print-data transmission request from the image forming apparatus. The image forming apparatus includes an input unit that inputs identification data for uniquely identifying the information processing apparatus, a second communication processing unit that transmits the print-data transmission request to the information processing apparatus corresponding to input identification data and that receives the print data transmitted from the information processing apparatus in response to the print-data transmission request, and a print unit that prints out the print data received from the information processing apparatus. The first communication processing unit transmits the print data stored in the storage unit to the second communication processing unit upon receiving the print-data transmission request from the image forming apparatus.

Furthermore, according to another aspect of the present invention, there is provided a printing method for a printing system including an information processing apparatus that processes information on a printing operation and an image forming apparatus that is connected to the information processing apparatus via a network and that performs the printing operation based on the information processed by the information processing apparatus. The printing method includes print-data storing including the information processing apparatus generating print data in response to a print request and storing the print data in a storage unit; standby entering including the information processing apparatus entering a standby state for waiting for a print-data transmission request from the image forming apparatus, when the print data is generated; identification-data inputting including the image forming apparatus inputting identification data for uniquely identifying the information processing apparatus; first transmitting including the image forming apparatus transmitting the print-data transmission request to the information processing apparatus corresponding to input identification data; first receiving including the image processing apparatus receiving the print-data transmission request from the image forming apparatus; second transmitting including the image processing apparatus transmitting the print data stored in the storage unit to the image forming apparatus upon receiving the print-data transmission request from the image forming apparatus; second receiving including the image forming apparatus receiving the print data transmitted from the information processing apparatus in response to the print-data transmission request; and printing including the image forming apparatus printing the print data received from the information processing apparatus.

Moreover, according to still another aspect of the present invention, there is provided a computer program product including a computer-usable medium having computer-readable program codes embodied in the medium for transmitting print data to an image forming apparatus connected via a network. The program codes when executed cause a computer to execute storing including generating print data in response to a print request and storing the print data in a storage unit; entering a standby state for waiting for a print-data transmission request from the image forming apparatus, when the print data is generated; receiving the print-data transmission request from the image forming apparatus; and transmitting the print data stored in the storage unit to the image forming apparatus upon receiving the print-data transmission request from the image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
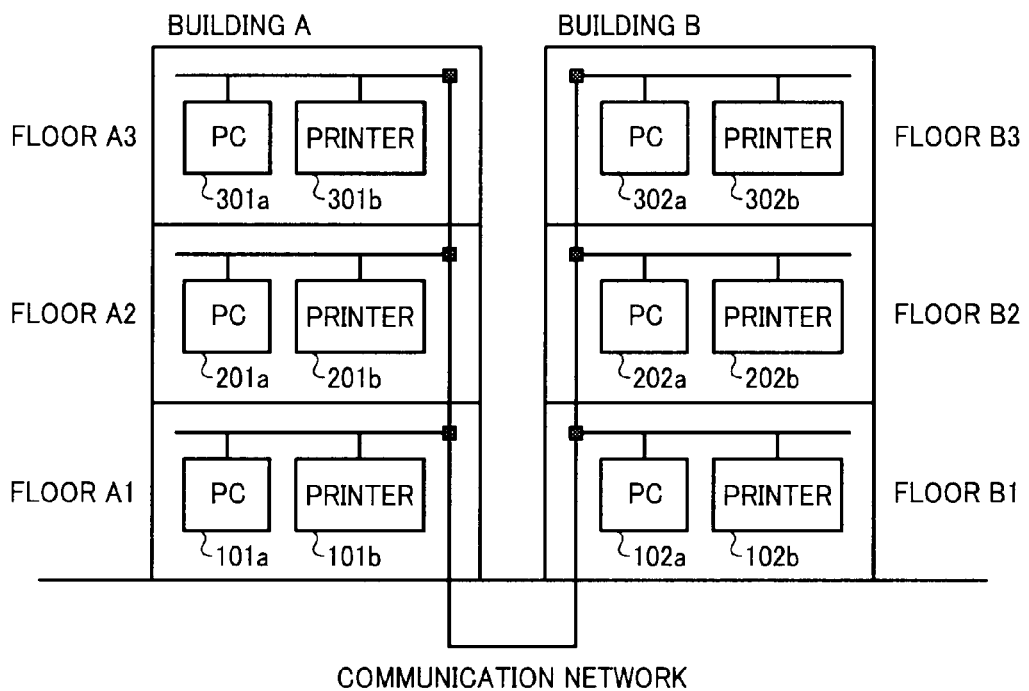
FIG. 1 is a schematic diagram of a printing system according to a first embodiment of the present invention.

FIG. 1 is a schematic diagram of a printing system according to a first embodiment of the present invention. A plurality of printers 101b, 201b, 301b, 102b, 202b, and 302b as image forming apparatuses and a plurality of PCs 101a, 201a, 301a, 102a, 202a, and 302a as terminals are connected via a local area network (LAN) as a communication network. The printers 101b to 302b receive print data from the PCs 101a to 302a, and print out the received print data. On the other hand, the PCs 101a to 302a transmit print data to the printers 101b to 302b in response to requests from the printers 101b to 302b. For convenience of explanation, the printers 101b to 302b and the PCs 101a to 302a are installed on floors of a building A and a building B.

Specifically, the PCs 101a, 201a, and 301a and the printers 101b, 201b, and 301b are installed in the building A, while the PCs 102a, 202a, and 302a and the printers 102b, 202b, and 302b are installed in the building B.

Figure 2:
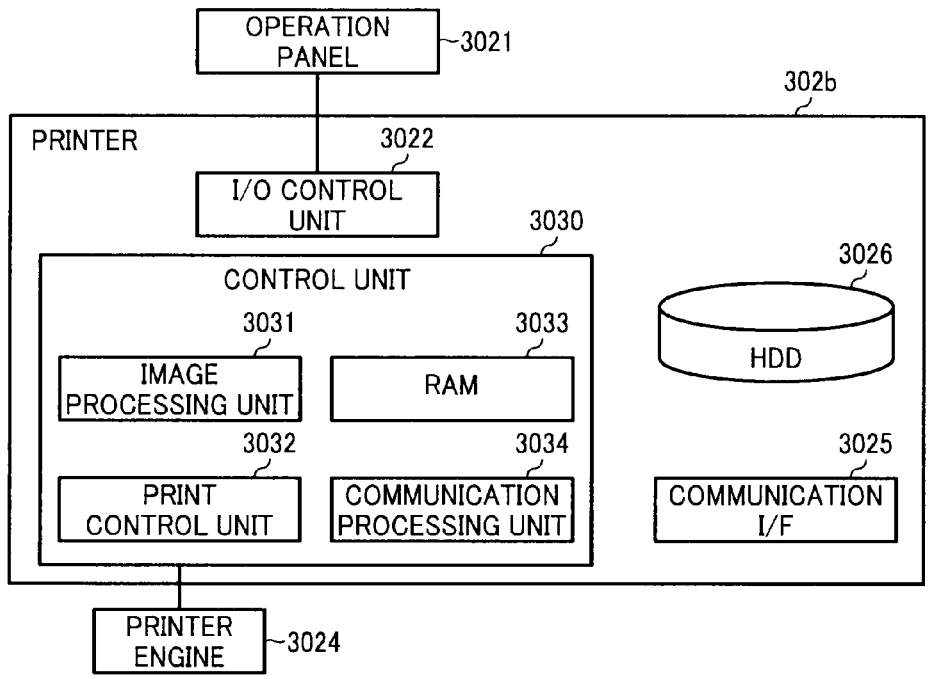
FIG. 2 is a block diagram for explaining a functional configuration of a printer in the printing system according to the first embodiment.

FIG. 2 is a block diagram for explaining a functional configuration of the printer 302b. In the following description, the configuration and the operation of the printer 302b are explained as an example. Each of the other printers 101b, 201b, 301b, 102b, and 202b has the same configuration as that of the printer 302b.

The printer 302b includes an operation panel 3021, an input/output (I/O) control unit 3022, a control unit 3030 including a central processing unit (CPU) (not shown), a communication interface (I/F) 3025, a hard disk drive (HDD) 3026, and a printer engine 3024.

The operation panel 3021 includes a liquid crystal display (LCD) unit (not shown) that displays various screen images and that is capable of receiving input from a user by touching, and an operation unit (not shown) that feeds input on an operation from a user.

The I/O control unit 3022 controls the LCD unit to display various screen images, and controls input from the user via the LCD unit and the operation unit. The user inputs an IP address that is identification data for uniquely identifying the PC 301a via the operation panel 3021, and the I/O control unit 3022 receives the IP address from the user.

The printer engine 3024 performs a printing operation. The communication I/F 3025 is a network device such as a network interface card (NIC). The HDD 3026 is a storage medium that stores therein various data, such as the IP address.

The CPU included in the control unit 3030 reads a print computer program from a read-only memory (ROM) (not shown) and executes the read print computer program, so that the control unit 3030 functions as each of units included in the control unit 3030. Specifically, the control unit 3030 includes an image processing unit 3031, a print control unit 3032, a communication processing unit 3034, and a random access memory (RAM) 3033.

The image processing unit 3031 performs image processing on print data. The print control unit 3032 controls the printer engine 3024 to perform a printing operation of the print data.

The communication processing unit 3034 transmits a print-data transmission request to the PC 301a corresponding to the IP address input by the user, thereby requesting the PC 301a to transmit the print data generated by the PC 301a. Moreover, when the PC 301a transmits the print data in response to the print-data transmission request, the communication processing unit 3034 receives the print data. Furthermore, when the printing operation of the print data is completed, the communication processing unit 3034 transmits a print complete notification to the PC 301a.

The RAM 3033 is a storage medium that temporarily stores therein various data such as print data.

Figure 3:
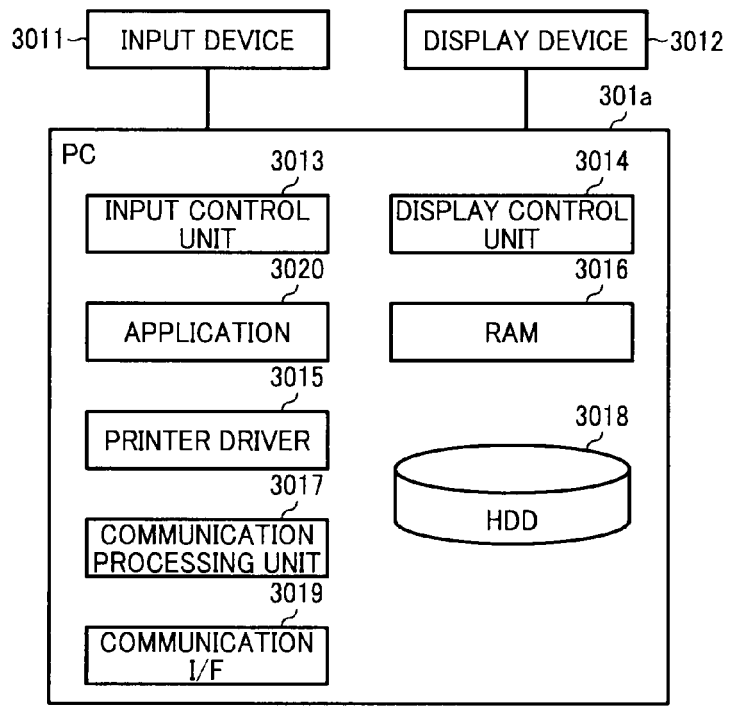
FIG. 3 is a block diagram for explaining a functional configuration of a PC in the printing system according to the first embodiment.

FIG. 3 is a block diagram for explaining a functional configuration of the PC 301a. The PC 301a includes an input device 3011, a display device 3012, an input control unit 3013, a display control unit 3014, an application 3020, a printer driver 3015, a communication processing unit 3017, a RAM 3016, an HDD 3018, and a communication I/F 3019.

The input device 3011 is, for example, a keyboard or a mouse. The display device 3012 is, for example, a monitor. The communication I/F 3019 is a network device such as the NIC.

The input control unit 3013 controls input from the user via the input device 3011. The display control unit 3014 controls the display device 3012 to display screen images or the like.

The application 3020 is an application computer program, such as document processing software such as a text editor, document display software, or spreadsheet software, and is executed by a CPU (not shown) of the PC 301a.

The printer driver 3015 generates print data, such as print description language (PDL) data, in response to a request from the user via the input device 3011, and stores the generated print data in the HDD 3018.

When the print data is generated by the printer driver 3015, the communication processing unit 3017 enters a standby state for waiting for the print-data transmission request from the printer 302b. Upon receiving the print-data transmission request from the printer 302b, the communication processing unit 3017 reads the print data from the HDD 3018, and transmits the read print data to the printer 302b.

The RAM 3016 is a storage medium that temporarily stores therein various data. The HDD 3018 is a storage medium that stores therein print data, the IP address of the PC 301a, and the like.

In the following description, it is explained a case in which the user uses the PC 301a at the desk on the floor A3 to print out documents to be used at a meeting held in a meeting room on the floor B3 of the building B.

Figure 4:
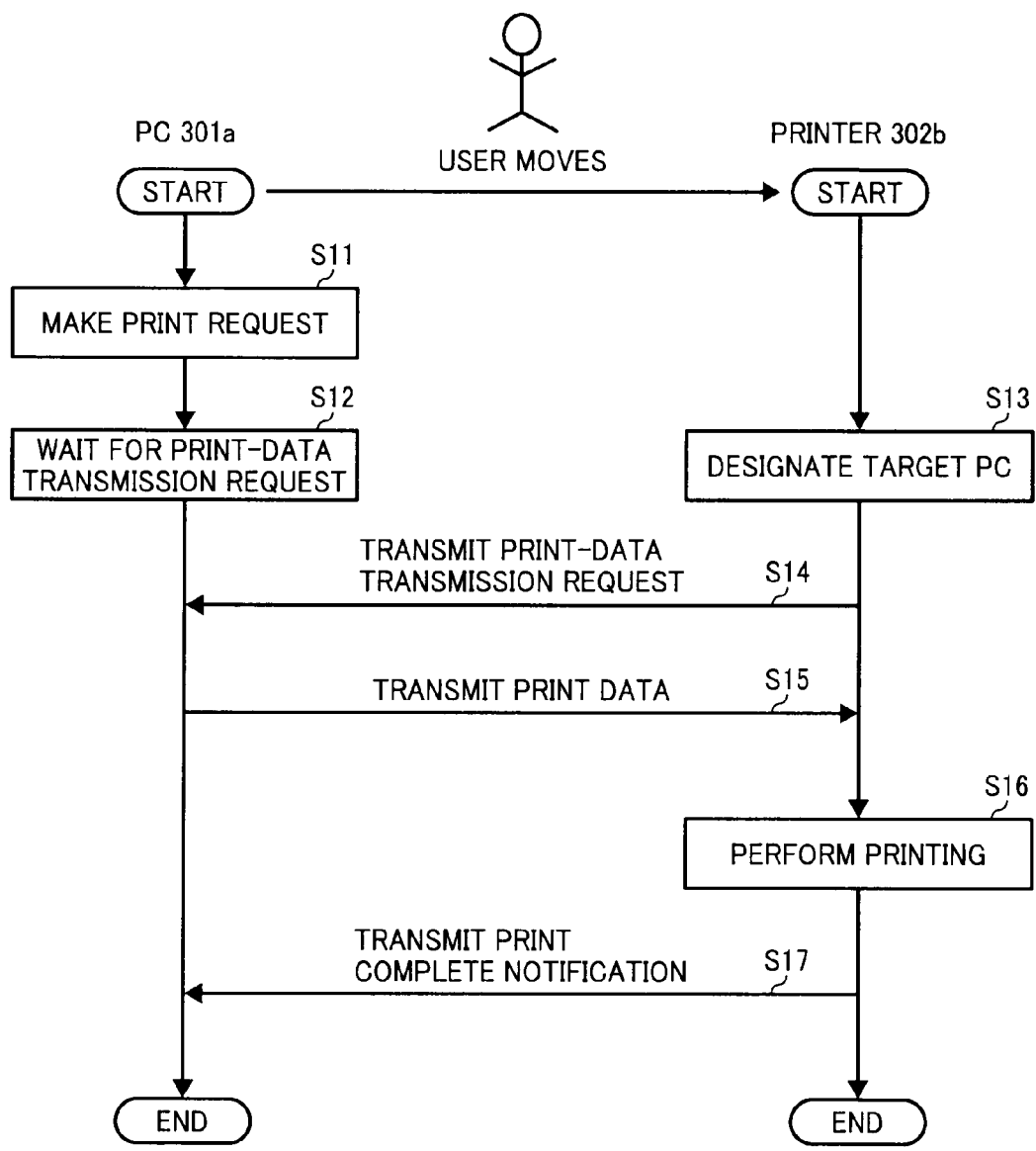
FIG. 4 is a flowchart for explaining a printing operation performed by the printing system according to the first embodiment.

FIG. 4 is a flowchart for explaining a printing operation performed by the printing system. The CPU of the PC 301a executes the application 3020 in response to a request for executing the application 3020 from the input device 3011. Then, the application 3020 receives a print request from the input device 3011 (Step S11). Upon receiving the print request from the input device 3011, the printer driver 3015 controls the display device 3012 to display a screen image for selecting a printer via the display control unit 3014.

Figure 5:
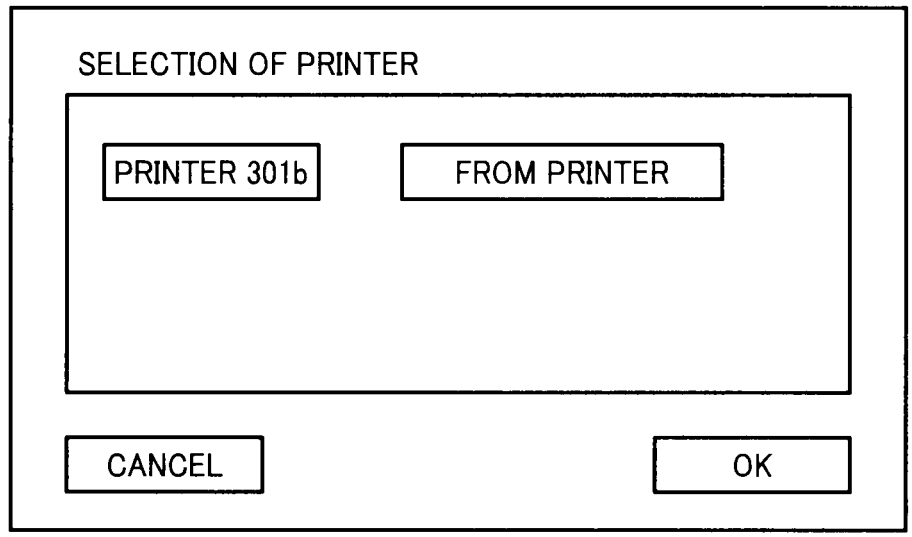
FIG. 5 is a schematic diagram for explaining an example of a screen image for a user to select a printer according to the first embodiment.

FIG. 5 is a schematic diagram for explaining an example of a screen image for the user to select a printer. The display device 3012 displays the screen image if the user does not designate a printer to be used for the printing operation.

In general, to perform the print request operation on the PC 301a, the user first performs an operation of selecting a printer to be used for the printing operation from options displayed on the screen. Because the user usually does not move to another floor from the floor A3 to print out documents, only the printer 301b is registered as a default printer in the PC 301a. However, in a print control system according to the first embodiment, an icon indicating that "From printer" is provided as an option displayed on the screen for selecting a printer. After the user selects the printer in the screen image shown in FIG. 5, the printer driver 3015 makes it possible for the user to specify settings on a sheet, such as a print size and a print direction, specify a condition, such as duplex printing or combine printing, or specify the number of copies or post-print processing such as sorting. However, the present invention is not limited to those. For example, if the user selects the printer that does not have a function of duplex printing after the user specifies the condition for the duplex printing as the print condition by the PC, it is possible to perform a process of forcibly performing the one-side printing instead of the duplex printing, rejecting the printing operation by the printer, or making the user determine whether the printing operation is to be forcibly performed or rejected via the operation unit of the printer. The print control system according to the first embodiment can be achieved in any of the above processes. However, to assign the highest priority to the user's selection of the printer, it is preferable to cause the printer selected by the user to forcibly perform the printing operation on only a print condition that can be satisfied by the selected printer out of print conditions specified in the PC by the user in advance.

When the user completes the print request operation, the printer driver 3015 generates print data, and stores the generated print data in the HDD 3018. Then, the communication processing unit 3017 enters the standby state for waiting for the print-data transmission request from a printer (Step S12).

Then, the user moves to the place where the printer to be used for the printing operation in accordance with the print request is installed. Because printed materials are to be used in the meeting held in the meeting room on the floor B3 shown in FIG. 1, the user moves to the printer 302b that is installed on the floor B3. The user confirms that the printer 302b is not in use, not out of order, or does not run out of sheets, and that the printer 302b is in an operable state in response to the print request. Afterward, the user performs, via the operation panel 3021, an operation of issuing the print-data transmission request to the PC 301a that is in the standby state for waiting for the print-data transmission request.

Figure 6:
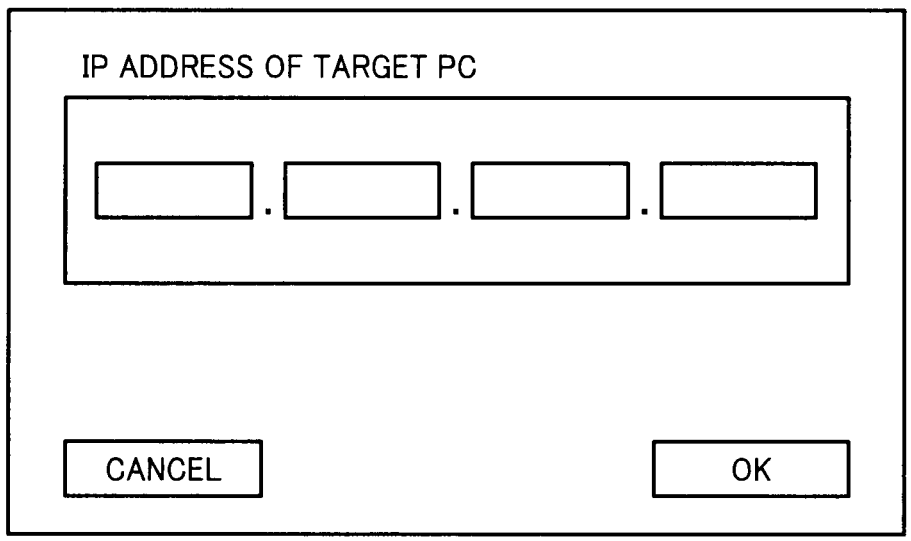
FIG. 6 is a schematic diagram for explaining an example of a screen image on an operation panel of the printer for designating a target PC to which a print-data transmission request is to be issued according to the first embodiment.

The I/O control unit 3022 causes the LCD unit to display a screen image for designating a target PC to which the print-data transmission request is to be issued. FIG. 6 is a schematic diagram for explaining an example of a screen image on the operation panel 3021 for designating a target PC to which the print-data transmission request is to be issued. In the first embodiment, the user inputs the IP address of the corresponding PC as data for designating the target PC (Step S13).

The user uses numeric keys (input unit) containing the numbers 0 to 9 displayed on the operation panel 3021 to input the IP address. Alternatively, the user can input a name of a corresponding PC (host name) instead of the IP address. To input the name of the PC, the user can use the numeric keys displayed on the operation panel 3021, or a software keyboard displayed on the screen with a touch panel. Furthermore, if the PC is in the standby state for waiting for a plurality of the print-data transmission requests, an entry field can be provided to input data for designating the print data to be printed out by the corresponding printer. These configurations are included in expansion of the print control system.

With the above configuration, when the user makes a plurality of print requests on the PC, the user can select one of the print requests on the printer, and cause the printer to print out the selected print data. Thus, the user-friendliness can be improved.

The I/O control unit 3022 receives the IP address of the PC 301a designated by the user via the operation panel 3021. The communication processing unit 3034 then transmits the print-data transmission request to the PC 301*a* corresponding to the received IP address via the communication network (Step S14).

Upon receiving the print-data transmission request from the printer 302*b*, the communication processing unit 3017 transmits the print data generated by the print request operation to the printer 302*b* (Step S15).

The communication processing unit 3034 then receives the print data from the PC 301*a*. The print control unit 3032 causes the printer engine 3024 to print out the received print data (Step S16). Then, when the printing operation is completed, the communication processing unit 3034 transmits the print complete notification to the PC 301*a* (Step S17).

When the communication processing unit 3017 receives the print complete notification from the printer 302*b*, the display control unit 3014 causes the display device 3012 to indicate that the printing operation is completed.

Although the print control system according to the first embodiment does not depend on a printer language, it is preferable to employ a printer language that is installed in all or most of printers in an environment to which the first embodiment is applied. Furthermore, it is preferable to apply the print control system according to the first embodiment to a printer in which a language that does not depend on a specific printer manufacturer is installed as standard, for example, a printer that can directly receive portable document format (PDF) data and print out the received data.

As described above, in the first embodiment, the user uses the desired printer to obtain printed materials as a result of the print request that is made on the PC at the desk of the user. Specifically, after the user performs the print request operation on the PC at the desk, if the user is located apart from the desk, or desires to use another printer that is not usually used or that is installed near the place in which printed materials are to be used, the user can use the printer to obtain the printed materials after confirming that the printer is currently in the operable state. Therefore, it is possible to prevent the user from making the print request to the printer on the PC many times because the printer is out of order or runs out of sheets. Thus, it is possible to reduce the unnecessary operations performed by the user. Furthermore, the user can use the printer installed near the place at which the materials printed by the print request are to be used even though the user does not know about the printer installed at that place in advance. Therefore, a distance for which the user needs to carry the printed materials can be shorter, and the operating efficiency can be improved. Furthermore, because the user can obtain the printed materials from the desired printer, it is possible to prevent an unauthorized user from taking the printed materials from the printer in the middle of the printing operation, or from performing the operation of interrupting the printing operation in the middle of the printing operation. Thus, it is possible to assure that only the authorized user obtains the printed materials. Moreover, because the print data is not spooled in the printer or the printer server, the data security can be improved.

In a second embodiment of the present invention, when the user moves to the floor B3 to use the printer 302*b*, if the printer 302*b* cannot be used because the printer 302*b* is out of order or runs out of sheets of a desired size, the user can use the printer 202*b* on the floor B2.

Moreover, in the second embodiment, if the printer 302*b* gets out of order in the middle of the printing operation, the user can use the printer 202*b* on the floor B2, so that the printing operation can be continued or restarted from the beginning.

Figure 7:
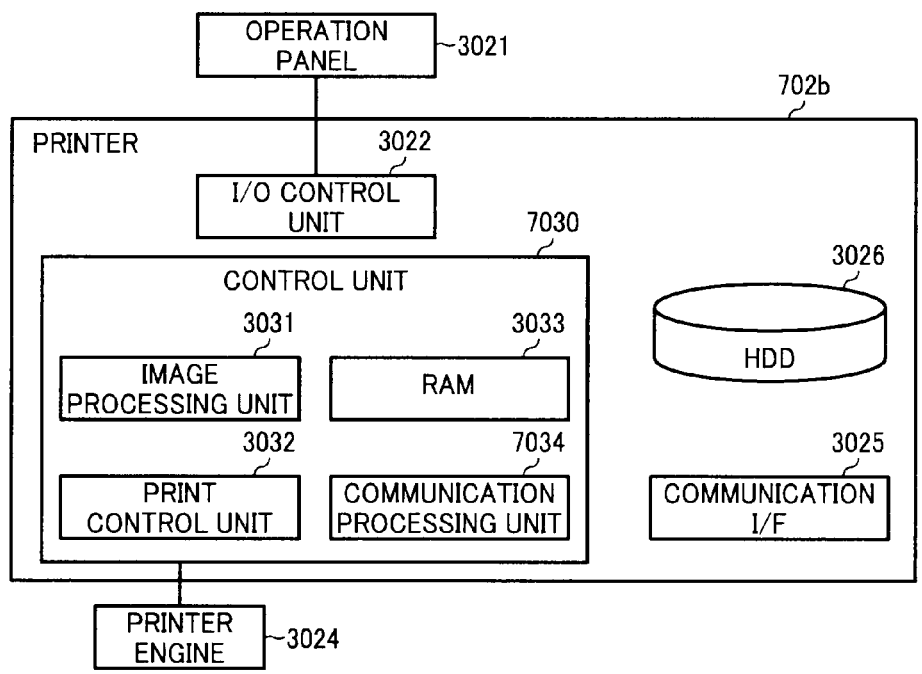
FIG. 7 is a block diagram for explaining a functional configuration of a printer in a printing system according to a second embodiment of the present invention.

FIG. 7 is a block diagram for explaining a functional configuration of a printer 702*b* according to the second embodiment. The printer 702*b* includes the operation panel 3021, the I/O control unit 3022, the communication I/F 3025, the HDD 3026, the printer engine 3024, and a control unit 7030 including a CPU (not shown).

The configurations of the operation panel 3021, the I/O control unit 3022, the printer engine 3024, the communication I/F 3025, and the HDD 3026 are the same as those in the first embodiment.

The CPU included in the control unit 7030 reads a print computer program from a ROM (not shown) and executes the read print computer program, so that the control unit 7030 functions as each of units included in the control unit 7030. Specifically, the control unit 7030 includes the image processing unit 3031, the print control unit 3032, the RAM 3033, and a communication processing unit 7034.

The configurations of the image processing unit 3031, the print control unit 3032, and the RAM 3033 are the same as those in the first embodiment.

The communication processing unit 7034 transmits the print-data transmission request and receives the print data in the same manner as the communication processing unit 3034 in the first embodiment. Furthermore, when the printing operation of the print data is completed, the communication processing unit 7034 transmits the print complete notification to a PC 701*a*. In the second embodiment, when the printing operation of the print data is interrupted due to an error or the like, the communication processing unit 7034 transmits print incomplete notification (print interruption notification) to the PC 701*a*. The print incomplete notification contains the number of print pages for which the printing operation has been properly completed.

Figure 8:
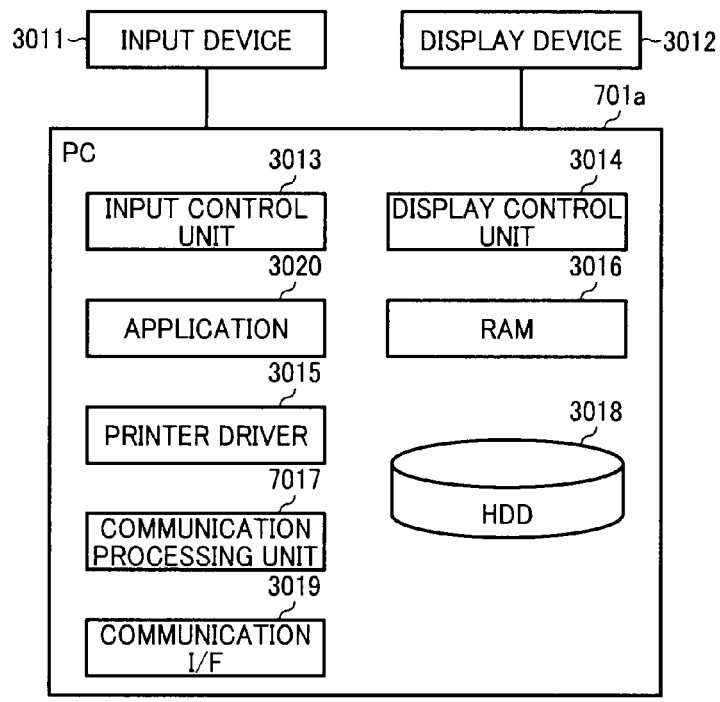
FIG. 8 is a block diagram for explaining a functional configuration of a PC in the printing system according to the second embodiment.

FIG. 8 is a block diagram for explaining a functional configuration of the PC 701*a*. The PC 701*a* includes the input device 3011, the display device 3012, the input control unit 3013, the display control unit 3014, the application 3020, the printer driver 3015, the RAM 3016, the HDD 3018, the communication I/F 3019, and a communication processing unit 7017.

The configurations of the input device 3011, the display device 3012, the input control unit 3013, the display control unit 3014, the application 3020, the printer driver 3015, the RAM 3016, the HDD 3018, and the communication I/F 3019 are the same as those in the first embodiment.

Upon receiving the print incomplete notification from the printer 702*b*, the communication processing unit 7017 obtains the number of print pages for which the printing operation has been completed from the print incomplete notification. The communication processing unit 7017 then reads the print data from the HDD 3018, and transmits print data on only the subsequent pages that follow the print pages to the printer 702*b*.

If the printing operation performed by the printer 702*b* is interrupted due to a print error or the like, the printer 702*b* transmits the print incomplete notification containing the number of print pages for which the printing operation has been completed to the PC 701*a* instead of the print complete notification at Step S17 as shown in FIG. 4.

Figure 9:
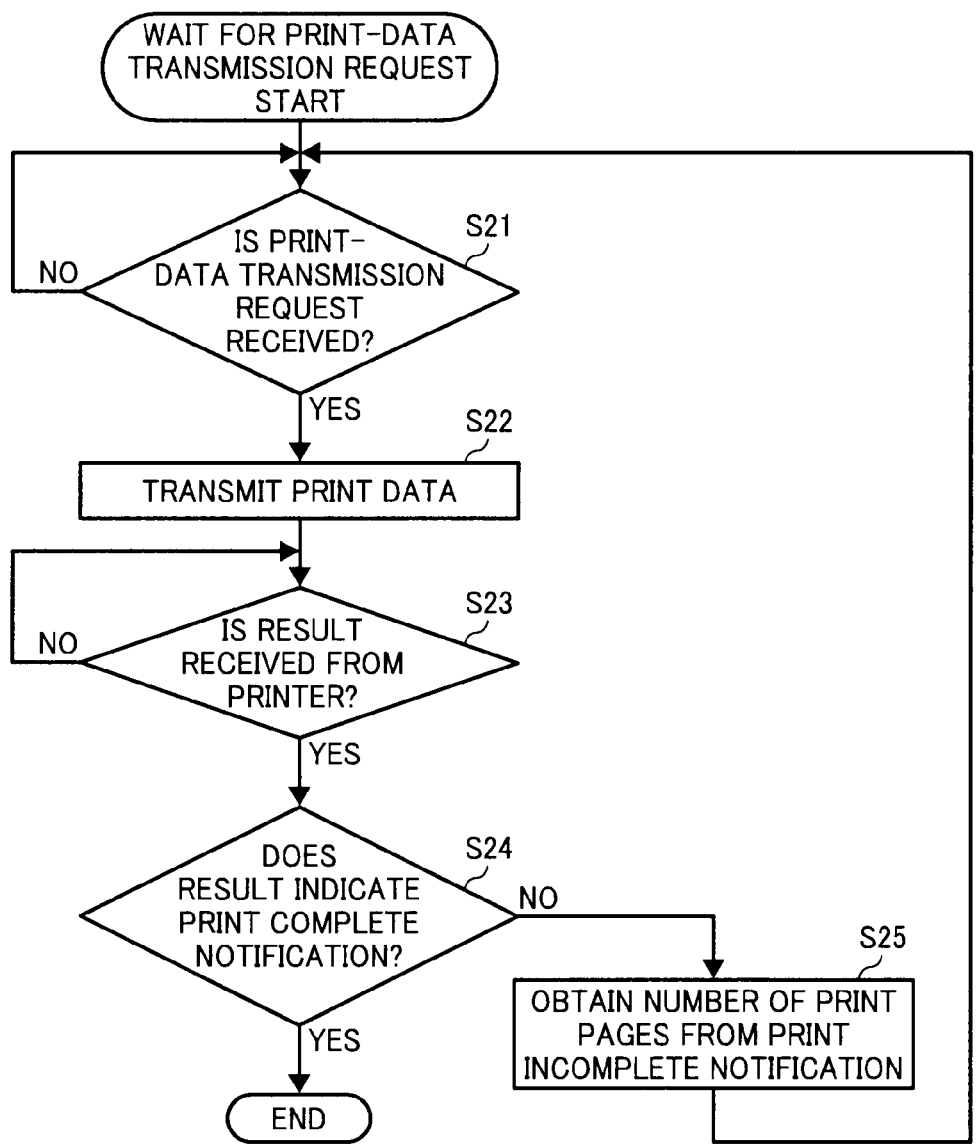
FIG. 9 is a flowchart for explaining an operation performed by the PC for transmitting print data according to the second embodiment.

FIG. 9 is a flowchart for explaining an operation performed by the PC 701*a* for transmitting the print data. In the same manner as in the first embodiment, after the print data is generated in response to the print request, the communication processing unit 7017 enters the standby state for waiting for the print-data transmission request (No at Step S21). Upon receiving the print-data transmission request from the printer

702*b* (Yes at Step S21), the communication processing unit 7017 transmits the print data to the printer 702*b* (Step S22).

The communication processing unit 7017 then enters the standby state for waiting for a print result from the printer 702*b* (No at Step S23). Upon receiving the print result from the printer 702*b* (Yes at Step S23), the communication processing unit 7017 determines whether the received print result indicates the print complete notification (Step S24). If the print result indicates the print complete notification (Yes at Step S24), the process ends.

On the other hand, if the print result does not indicate the print complete notification (No at Step S24), i.e., if the print result indicates the print incomplete notification, the communication processing unit 7017 obtains the number of print pages for which the printing operation has been completed from the print incomplete notification (Step S25). Then, the PC 701*a* repeats the process from Step S21 to Step S24. At Step S22, the communication processing unit 7017 reads the print data from the HDD 3018, and transmits the print data on only the subsequent pages that follow the print pages obtained at Step S25 out of the read print data to the printer 702*b*.

It is explained in the second embodiment that, when the print incomplete notification is received, the print data on only the subsequent pages that follow the print pages is transmitted to the printer 702*b*. However, the print data on the whole pages can be retransmitted to the printer 702*b*.

As described above, in the second embodiment, if the printer gets out of order in the middle of the printing operation, the user can use another printer to continue the printing operation or restart the printing operation from the beginning.

Although it is explained in the first embodiment that the user inputs the data to designate a target PC via the operation panel 3021, the user can use a portable storage medium such as a universal serial bus (USB) memory that is widely used as a PC peripheral instead of inputting the data via the operation panel 3021. Specifically, in a third embodiment of the present invention, the PC stores data about itself (the IP address, the host name, or the like) in the portable storage medium, and the portable storage medium is connected to the printer selected by the user, so that the printer reads the data about the PC from the portable storage medium.

Figure 10:
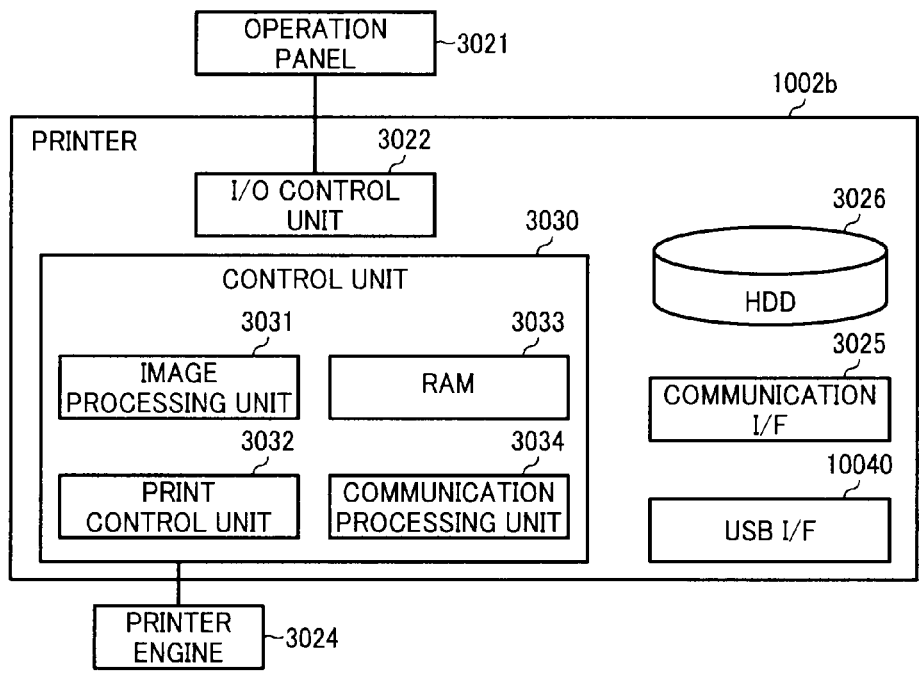
FIG. 10 is a block diagram for explaining a functional configuration of a printer in a printing system according to a third embodiment of the present invention.

FIG. 10 is a block diagram for explaining a functional configuration of a printer 1002*b* according to the third embodiment. The printer 1002*b* includes the operation panel 3021, the I/O control unit 3022, the control unit 3030, the communication I/F 3025, the HDD 3026, the printer engine 3024, and a USB I/F 10040.

The configurations of the operation panel 3021, the I/O control unit 3022, the printer engine 3024, the communication I/F 3025, the HDD 3026, and the control unit 3030 are the same as those in the first embodiment.

The USB I/F 10040 controls reading/writing data from/to the USB memory.

Figure 11:
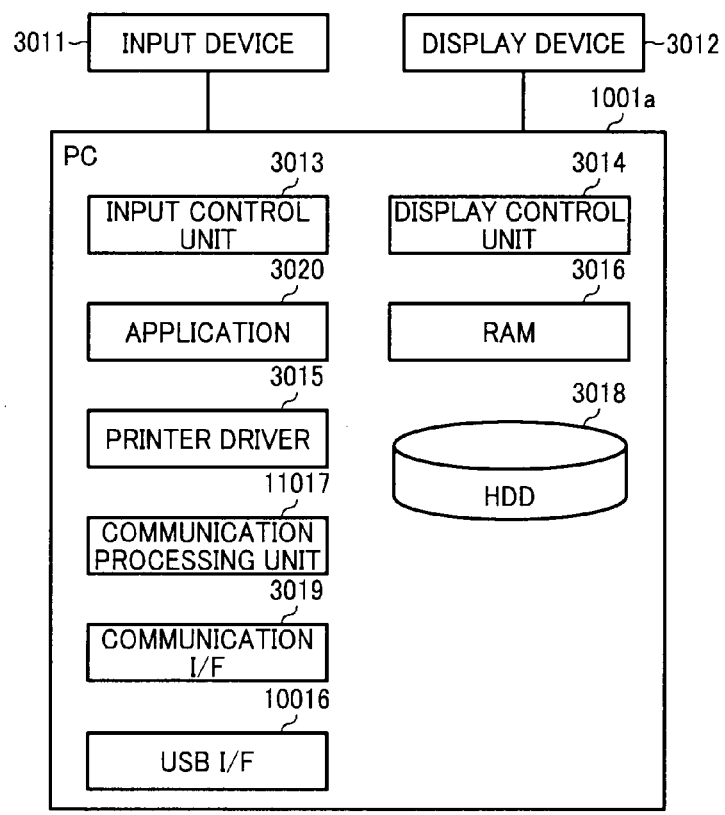
FIG. 11 is a block diagram for explaining a functional configuration of a PC in the printing system according to third embodiment.

FIG. 11 is a block diagram for explaining a functional configuration of a PC 1001*a* according to third embodiment. The PC 1001*a* includes the input device 3011, the display device 3012, the input control unit 3013, the display control unit 3014, the application 3020, the printer driver 3015, the RAM 3016, the HDD 3018, the communication I/F 3019, a communication processing unit 11017, and a USB I/F 10016.

The configurations of the input device 3011, the display device 3012, the input control unit 3013, the display control unit 3014, the application 3020, the printer driver 3015, the RAM 3016, the HDD 3018, and the communication I/F 3019 are the same as those in the first embodiment.

The USB I/F 10016 controls reading/writing data from/to the USB memory.

The PC 1001*a* stores the print-data transmission request and the IP address of the PC 1001*a* in the USB memory that is connected to the USB I/F 10016.

Then, the USB memory is connected to the USB I/F 10040. The communication processing unit 3034 then reads the print-data transmission request and the IP address of the PC 1001*a* from the USB memory connected to the USB I/F 10040, and transmits the read print-data transmission request to the PC 1001*a*.

Figure 12:
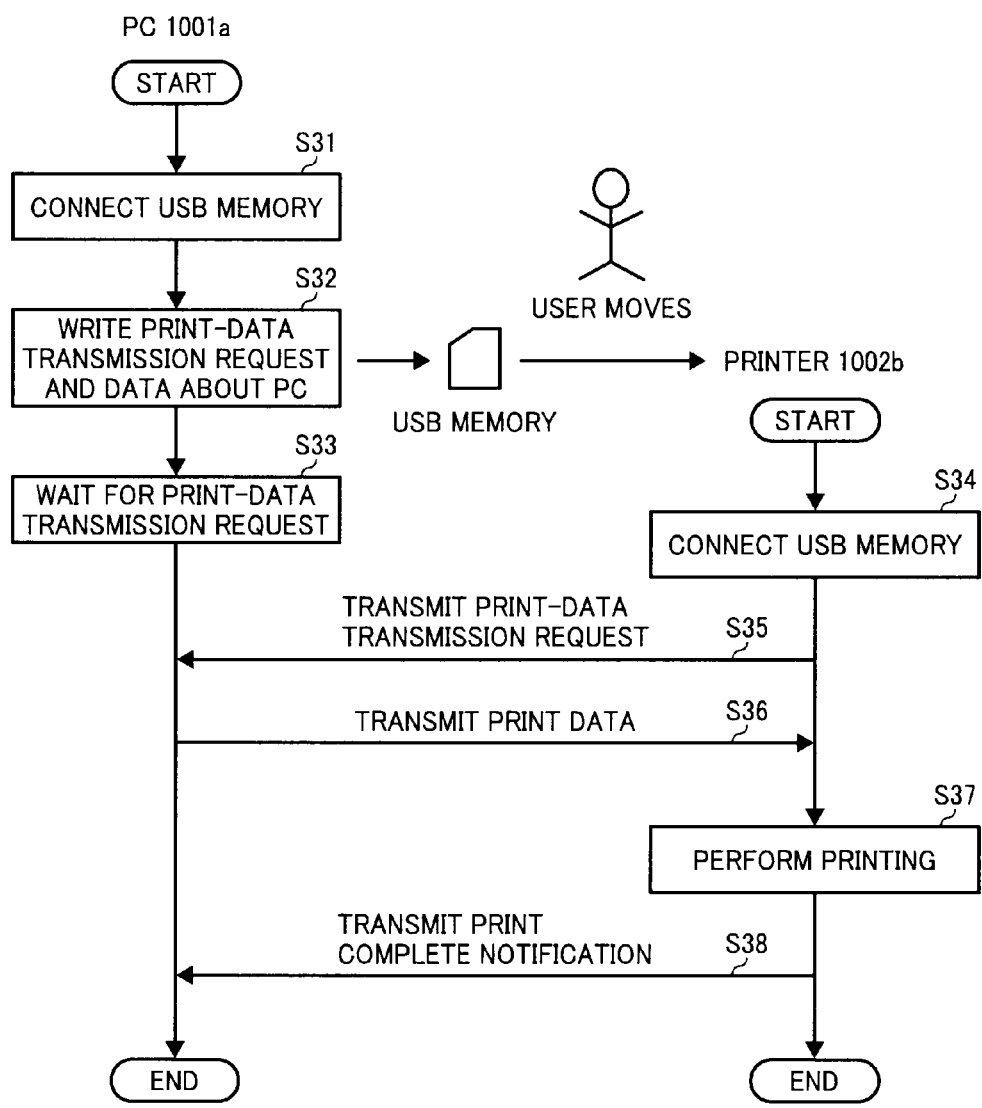
FIG. 12 is a flowchart for explaining a printing operation performed by the printing system according to the third embodiment.

FIG. 12 is a flowchart for explaining a printing operation performed by a printing system according to the third embodiment.

When the USB memory is connected to the USB I/F 10016 (Step S31), the PC 1001*a* writes the print-data transmission request and the data about the PC 1001*a* (the IP address or the host name) in the USB memory (Step S32). Then, the communication processing unit 11017 enters the standby state for waiting for the print-data transmission request (Step S33).

Afterward, the user moves to the printer 1002*b*, and connects the USB memory to the USB I/F 10040. When the printer 1002*b* detects that the USB memory is connected to the USB I/F 10040 (Step S34), the printer 1002*b* transmits the print-data transmission request stored in the USB memory to the PC 1001*a* corresponding to the data (the IP address or the host name) stored in the USB memory (Step S35).

Upon receiving the print-data transmission request from the printer 1002*b*, the communication processing unit 11017 transmits the print data generated by the print request operation to the printer 1002*b* (Step S36).

The communication processing unit 3034 then receives the print data from the PC 1001*a*. The print control unit 3032 then causes the printer engine 3024 to print out the received print data (Step S37). When the printing operation is completed, the communication processing unit 3034 transmits the print complete notification to the PC 1001*a* (Step S38). If the printing operation is interrupted, the communication processing unit 3034 transmits the print incomplete notification to the PC 1001*a* in the same manner as in the second embodiment.

When the communication processing unit 11017 receives the print complete notification from the printer 1002*b*, the display control unit 3014 causes the display device 3012 to indicate that the printing operation is completed.

The printer 1002*b* needs to have a secure digital (SD) card slot or a USB slot, and a hardware configuration such that the printer 1002*b* can read data from a SD card or the USB memory that is connected to the SD card slot or the USB slot. Because the printer having such a hardware configuration has been widely used, the third embodiment can be easily applied to the printer.

As described above, in the third embodiment, the user does not need to be aware of the data about the PC, and it is possible to prevent a problem that the printing operation cannot be performed due to an input error caused by the user's faulty memory. The user does not need to remember detailed data about the PC on which the user performs the print request operation, or does not need to input the data via the operation panel of the printer. Thus, the user-friendliness can be improved.

In the above embodiments, the PC receives the print-data transmission request from the printer, but cannot determine whether the print-data transmission request is received from the printer selected by the authorized user. Therefore, if the unauthorized user transmits the print-data transmission request to the PC from another printer prior to the authorized user, the unauthorized user can obtain the print data instead of the authorized user. To prevent such a problem, data that only the authorized user knows is transmitted between the PC and the printer, so that it is verified that the print-data transmission request is transmitted from the printer selected by the authorized user.

For example, the print request operation on the PC includes an operation of displaying a password for uniquely identifying the print request generated on the PC, and the operation of designating the PC on the printer includes an operation of inputting the password.

Figure 13:
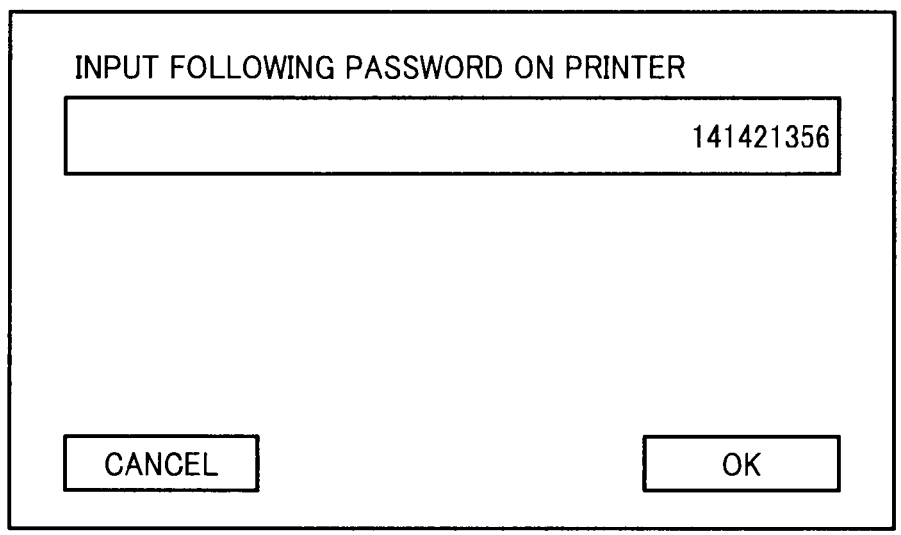
FIG. 13 is an example of a screen image for displaying a password on the PC according to the third embodiment.
Figure 14:
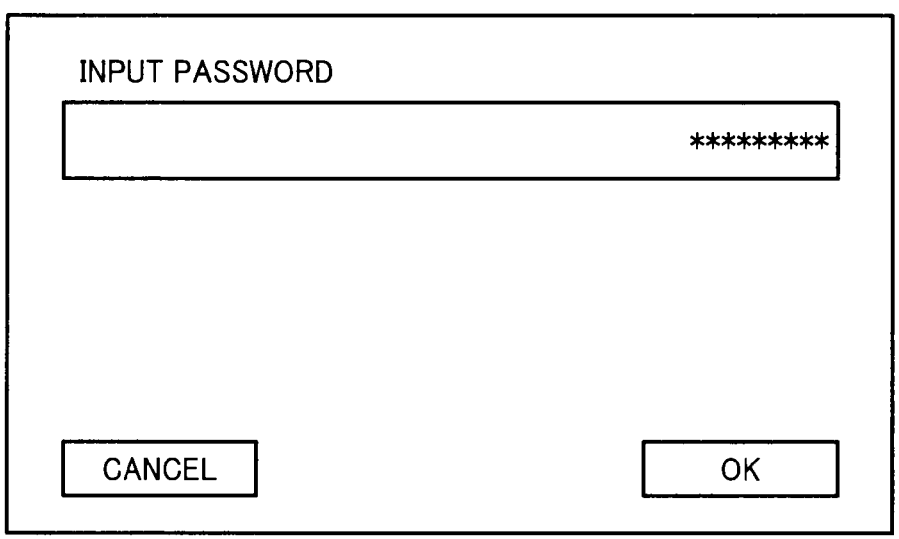
FIG. 14 is an example of a screen image for inputting the password via the operation panel of the printer according to the third embodiment.

FIG. 13 is an example of a screen image for displaying the password on the PC. FIG. 14 is an example of a screen image for inputting the password via the operation panel of the printer. The print-data transmission request transmitted from the printer to the PC contains the password that is input by the user in the operation of designating the PC on the printer. If the password contained in the received print-data transmission request does not match the password displayed in the print request operation on the PC, the PC ignores the print-data transmission request. The password is stored in the HDD 3018 in advance. The CPU (serving as an authenticating unit) of the PC reads the password from the HDD 3018, and causes the display unit to display the password.

Figure 15:
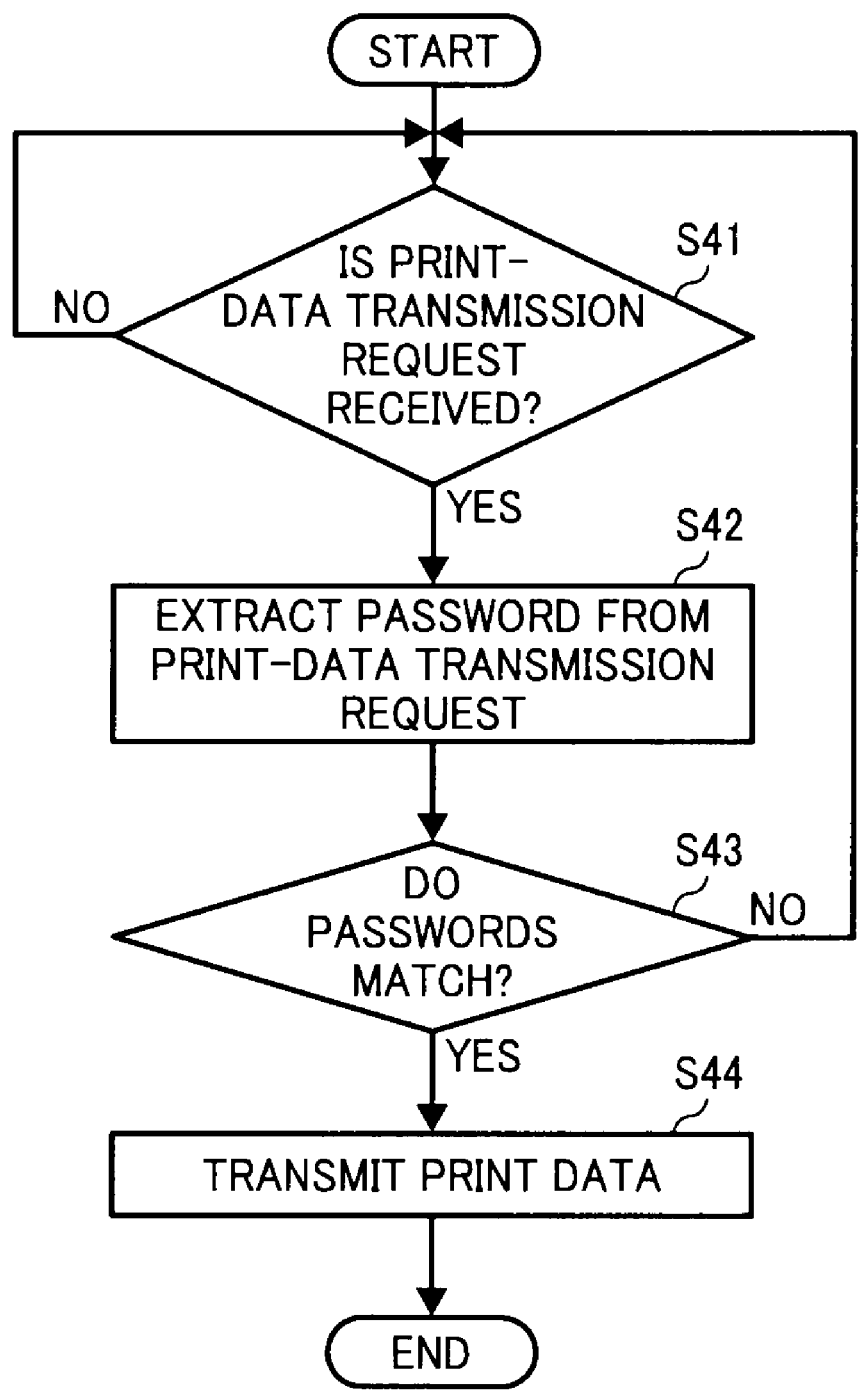
FIG. 15 is a flowchart for explaining an operation performed by a PC for transmitting the print data according to a first modification of the third embodiment.

FIG. 15 is a flowchart for explaining an operation performed by the PC for transmitting the print data according to a first modification of the third embodiment.

In the same manner as in the first embodiment, when the print data is generated in response to the print request, the communication processing unit 11017 enters the standby state for waiting for the print-data transmission request (No at Step S41). When the communication processing unit 11017 receives the print-data transmission request from the printer 1002*b* (Yes at Step S41), the password is extracted from the print-data transmission request (Step S42).

Then, the PC 1001*a* determines whether the extracted password matches the password displayed in the print request operation thereby performing authentication of the user (Step S43). If the passwords match (Yes at Step S43), i.e., the extracted password matches the password stored in the HDD 3018, the PC 1001*a* determines that the user is authentic, and the communication processing unit 11017 transmits the print data generated in the print request operation to the printer 1002*b* (Step S44).

If the passwords do not match (No at Step S43), the PC 1001*a* determines that the user is not authentic, and the communication processing unit 11017 returns to the standby state for waiting for the print-data transmission request.

In a second modification of the third embodiment, the print request operation performed on the PC 1001*a* includes an operation of inputting the password, and the operation of designating the PC on the printer 1002*b* includes an operation of inputting the password. Specifically, when the print request operation is performed on the PC 1001*a*, the screen image shown in FIG. 14 for inputting the password is displayed, so that the user can input any password. The user inputs the same password via the operation panel 3021 in the operation of designating the PC on the printer 1002*b*, so that the password is contained in the print-data transmission request transmitted from the printer 1002*b* to the PC 1001*a*. Moreover, the PC 1001*a* can prepare the password by using, for example, a random number generation function based on a value, such as a number or a string of characters, which is input from the input device 3011. The CPU of the PC 1001*a* stores the prepared password in the HDD 3018.

If the password contained in the received print-data transmission request does not match the password that is input in the print request operation, i.e., the password stored in the HDD 3018, the communication processing unit 11017 ignores the print-data transmission request.

If it is inconvenient for the user to input the password every time the user makes the print request, the password can be set in advance. The effect obtained by the print control system according to the third embodiment is not affected by details of the operation of inputting the password. For example, when the printer 1002*b* including the USB I/F 10040 is used, it can be configured such that the authentication data, such as a password, is stored in the USB memory in advance, and then the USB memory is connected to the USB I/F 10040, so that the authentication data is input to the printer 1002*b* from the USB memory. Furthermore, the password contained in the print-data transmission request can be encrypted, so that it is possible to prevent data from being intercepted on the network. Because the effect obtained by the print control system according to the third embodiment is not affected by whether the encryption is performed or not, the explanation on the case in which the password is encrypted is omitted.

As described above, in the second modification, it is possible to reduce the possibility that, after the authorized user performs the print request operation on the PC, the unauthorized user issues the print-data transmission request from the printer before the authorized user issues the print-data transmission request from the selected printer. Thus, the security for the print data can be improved.

Furthermore, because the user can use the password that only the user knows as authentication data, it is possible to reduce the possibility that the unauthorized user issues the print-data transmission request from the printer to obtain printed materials. Thus, the security for the print data can be improved.

Figure 16:
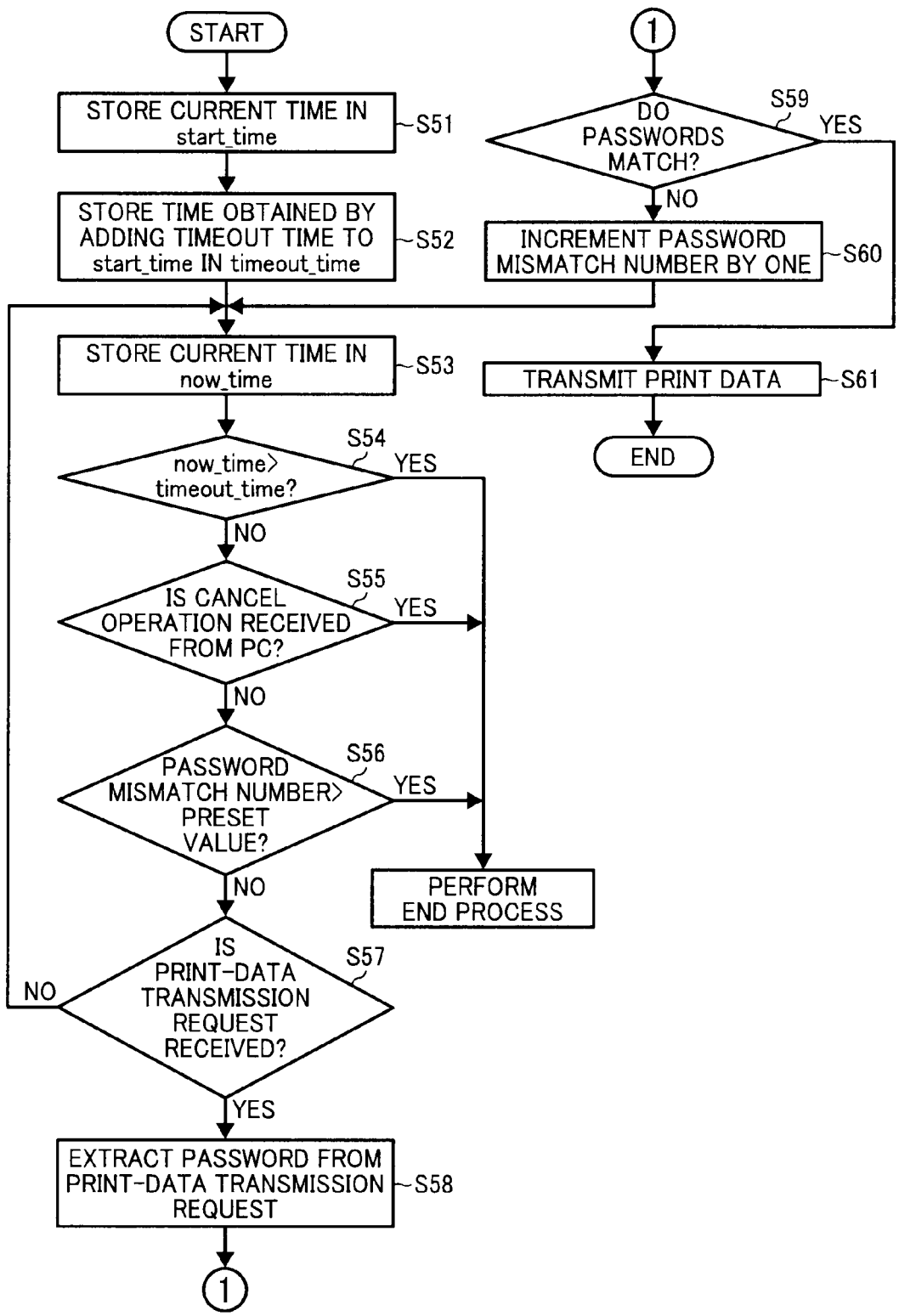
FIG. 16 is a flowchart for explaining an operation performed by the PC for transmitting the print data regarding a cancel operation performed by a user, or a cancel operation due to timeout or authentication failure.

FIG. 16 is a flowchart for explaining an operation performed by the PC for transmitting the print data regarding a cancel operation performed by the user, or a cancel operation due to timeout or authentication failure.

The CPU of the PC stores the current time as a value of a parameter "start_time" in the HDD 3018 (Step S51). Then, the CPU stores the time obtained by adding a predetermined timeout time to the value of the parameter "start_time" as a value of a parameter "timeout_time" in the HDD 3018 (Step S52). The timeout time is stored in the HDD 3018 in advance.

The CPU stores the current time as a value of a parameter "now_time" (Step S53). Then, the CPU determines whether the value of the parameter "now_time" is larger than the value of the parameter "timeout_time" (Step S54). If the value of the parameter "now_time" is smaller than the value of the parameter "timeout_time" (No at Step S54), the process control proceeds to Step S55. If the value of the parameter "now_time" is larger than the value of the parameter "timeout_time" (Yes at Step S54), the termination process is performed.

When the process control proceeds to Step S55, the input control unit 3013 determines whether a cancel operation is received from the input device 3011 (Step S55). If the cancel operation is not received (No at Step S55), the process control proceeds to Step S56. If the cancel operation is received from the input device 3011 (Yes at Step S55), the termination process is performed.

When the process control proceeds to Step S56, the CPU determines whether the number of times that the passwords do not match (hereinafter, "password mismatch number") exceeds a preset value (Step S56). If the current password mismatch number does not exceed the preset value (No at Step S56), the process control proceeds to Step S57. On the other hand, if the current password mismatch number exceeds the preset value (Yes at Step S56), the termination process is performed. The preset value is stored in the HDD 3018 in advance.

When the process control proceeds to Step S57, the communication processing unit 11017 enters the standby state for waiting for the print-data transmission request (No at Step S57). When the communication processing unit 11017 receives the print-data transmission request (Yes at Step S57), the password is extracted from the received print-data transmission request (Step S58). If the extracted password matches the password displayed in the print request operation, i.e., the extracted password matches the password stored in the HDD 3018 (Yes at Step S59), the CPU of the PC causes the print data generated by the print request operation to be transmitted to the printer (Step S61). On the other hand, if the passwords do not match (No at Step S59), the CPU causes the password mismatch number to be incremented by one (Step S60), and the process control returns to Step S53 in which the current time is stored as the value of the parameter "now_time".

As described above, the print request for which the PC is in the standby state for waiting for the print-data transmission request is terminated and the print data is deleted from the PC, when the cancel operation is performed by the PC, when the number of the authentication failures reaches a predetermined number, when a predetermined time elapses, or when the print complete notification is received from the printer. Specifically, because the print request is canceled after one or several times of the authentication failures, it is possible to reduce the possibility that the unauthorized user breaks the password by exhaustively guessing the password using a dictionary, even if the user improperly uses the simple password. Thus, the security for the print data can be improved.

Furthermore, if the print request does not need to be performed by the user for some reason, or if the user forgets to perform the print request, the print request is automatically canceled when a predetermined time elapses from a start time at which the print request operation is completed on the PC. Therefore, it is possible to reduce the possibility that the unnecessary print request remains for a long time, or the unauthorized user issues the print-data transmission request for the print request that is forgot by the authorized user, thereby obtaining printed materials. Thus, the security for the print data can be improved.

According to one aspect of the present invention, it is possible to perform a print request operation without designating an image forming apparatus to be used for a printing operation in advance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system, comprising:
an information processing apparatus that processes information on a printing operation; and
an image forming apparatus that is connected to the information processing apparatus via a network and that performs the printing operation based on the information processed by the information processing apparatus, wherein
the information processing apparatus includes
a print-data generating unit that generates print data in response to a print request from a user, the print request including a status indicating that a printout destination has not been selected by the user,
a storage unit that stores therein the print data generated by the print-data generating unit, and
a first communication processing unit that, when the print-data generating unit generates the print data, enters a standby state for waiting for a print-data transmission request from the image forming apparatus;
the image forming apparatus includes
an input unit that receives identification data uniquely identifying the information processing apparatus in which the print data is stored, wherein the input unit receives, when the information processing apparatus is in the standby state and waiting for a plurality of print-data transmission requests corresponding to a plurality of print data, a designation selecting one of the plurality of print data to be printed out by the image forming apparatus,
a second communication processing unit that transmits the print-data transmission request to the information processing apparatus corresponding to the received identification data and that receives the print data transmitted from the information processing apparatus in response to the print-data transmission request, and
a print unit that prints out the print data received from the information processing apparatus;
the first communication processing unit transmits the print data stored in the storage unit to the second communication processing unit upon receiving the print-data transmission request from the image forming apparatus, which is the printout destination; and
when the first communication processing unit receives a print incomplete notification from the image forming apparatus that received the print data, the first communication processing unit obtains a number of print pages for which the printing operation has been completed from the print incomplete notification, and transmits, of the print data, only subsequent pages that follow the obtained number of print pages to another image forming apparatus.

2. The printing system according to claim 1, wherein the input unit receives user input by a user operation.

3. The printing system according to claim 1, wherein
the information processing apparatus further includes a storage processing unit that stores the identification data in a portable storage medium, and
the input unit inputs the identification data stored in the portable storage medium.

4. The printing system according to claim 1, wherein
when the printing operation performed by the print unit is interrupted, the second communication processing unit transmits the print incomplete notification indicating that the printing operation is not completed to the first communication processing unit.

5. The printing system according to claim 1, wherein
when the printing operation performed by the print unit is interrupted, the second communication processing unit transmits the print incomplete notification indicating that the printing operation is not completed, wherein the print incomplete notification includes the number of print pages for which the printing operation has been completed, to the first communication processing unit.

6. The printing system according to claim 1, wherein
the input unit further inputs authentication data for uniquely identifying a user,
the storage unit further stores therein the authentication data, the second communication processing unit transmits the authentication data with the print-data transmission request to the first communication processing unit, the information processing apparatus further includes an authenticating unit that, upon receiving the authentication data from the second communication processing unit, performs authentication of the user based on the authentication data received from the second communication processing unit and the authentication data stored in the storage unit, and the first communication processing unit transmits the print data to the second communication processing unit upon the authenticating unit authenticating the user.

7. The printing system according to claim 6, wherein when the authenticating unit does not authenticate the user, the first communication processing unit does not transmit the print data to the second communication processing unit.

8. The printing system according to claim 6, wherein the authentication data stored in the storage unit is generated based on an input by the user.

9. The printing system according to claim 6, wherein the input unit inputs the authentication data from a portable storage medium.

10. The printing system according to claim 1, wherein when the first communication processing unit does not receive the print-data transmission request within a predetermined time, the first communication processing unit does not transmit the print data to the second communication processing unit.

11. The printing system of claim 1, wherein the information processing apparatus further includes a display control unit configured to cause a display to display an input screen listing at least one printout destination selectable by the user and to display a selectable icon indicating that no printout destination is selected by the user, but that printing will be requested from a printer.

12. A printing method for a printing system including an information processing apparatus that processes information on a printing operation and an image forming apparatus that is connected to the information processing apparatus via a network and that performs the printing operation based on the information processed by the information processing apparatus, the printing method comprising:

generating, by the information processing apparatus, print data in response to a print request from a user and storing the print data in a storage unit, the print request including a status indicating that a printout destination has not been selected by the user;

entering, by the information processing apparatus, a standby state for waiting for a print-data transmission request from the image forming apparatus, when the print data is generated;

receiving, by the image forming apparatus, identification data uniquely identifying the information processing apparatus in which the print data is stored;

receiving, when the information processing apparatus is in the standby state and waiting for a plurality of print-data transmission requests corresponding to a plurality of print data, a designation selecting one of the plurality of print data to be printed out by the image forming apparatus;

transmitting, by the image forming apparatus, the print-data transmission request to the information processing apparatus corresponding to the received identification data;

receiving, by the image processing apparatus, the print-data transmission request from the image forming apparatus;

transmitting, by the image processing apparatus, the print data stored in the storage unit to the image forming apparatus upon receiving the print-data transmission request from the image forming apparatus;

receiving, by the image forming apparatus, the print data transmitted from the information processing apparatus in response to the print-data transmission request;

printing, by the image forming apparatus, which is the printout destination, the print data received from the information processing apparatus;

receiving, by the information processing apparatus, a print incomplete notification from the image forming apparatus, the print incomplete notification indicating a number of print pages for which the printing operation has been completed; and transmitting, by the information processing apparatus to another image forming apparatus, of the print data, only subsequent pages that follow the number of print pages.

13. A non-transitory computer-readable medium having computer-readable program codes embodied in the medium for transmitting print data to an image forming apparatus connected via a network, the program codes when executed causing an information processing apparatus to execute the steps of:

generating print data in response to a print request from a user and storing the print data in a storage unit, the print request including a status indicating that a printout destination has not been selected by the user;

entering a standby state for waiting for a print-data transmission request from the image forming apparatus, when the print data is generated;

receiving the print-data transmission request from the image forming apparatus;

receiving, when the information processing apparatus is in the standby state and waiting for a plurality of print-data transmission requests corresponding to a plurality of print data, a designation selecting one of the plurality of print data to be printed out by the image forming apparatus;

transmitting the print data stored in the storage unit to the image forming apparatus, which is the printout destination, upon receiving the print-data transmission request from the image forming apparatus;

receiving, by the information processing apparatus, a print incomplete notification from the image forming apparatus, the print incomplete notification indicating a number of print pages for which the printing operation has been completed; and transmitting, by the information processing apparatus to another image forming apparatus, of the print data, only subsequent pages that follow the number of print pages.

* * * * *